(No Model.)
D. PEPPER, Jr.
ELECTRODE FOR BATTERIES AND METHOD OF MAKING THE SAME.
No. 434,457. Patented Aug. 19, 1890.
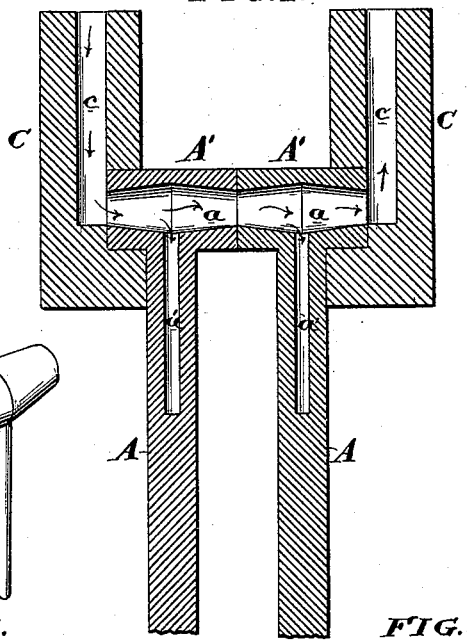
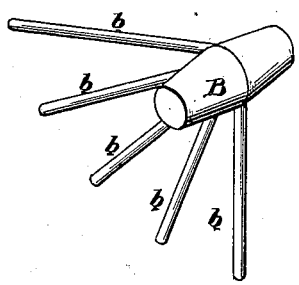
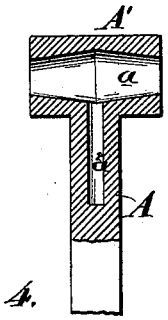
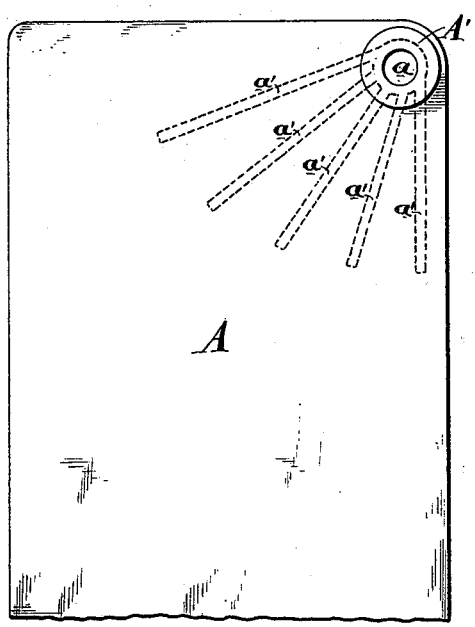
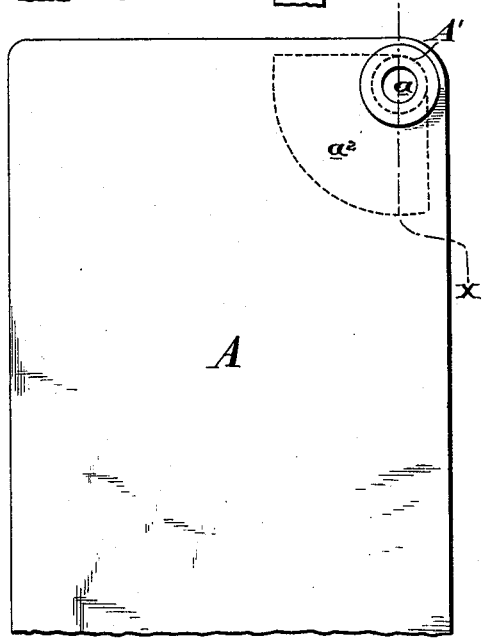
WITNESSES:
David B. Williams
Henry Drury
INVENTOR:
David Pepper Jr
by his attorney
Francis T. Chambers

UNITED STATES PATENT OFFICE.

DAVID PEPPER, JR., OF PHILADELPHIA, PENNSYLVANIA.

ELECTRODE FOR BATTERIES AND THE METHOD OF MAKING THE SAME.

SPECIFICATION forming part of Letters Patent No. 434,457, dated August 19, 1890.

Application filed October 14, 1889. Serial No. 326,990. (No specimens.)

*To all whom it may concern:*

Be it known that I, DAVID PEPPER, Jr., of the city and county of Philadelphia, State of Pennsylvania, have invented a new and useful Electrode and Method of Constructing Electrodes for Primary and Secondary Batteries, of which the following is a true and exact description, reference being had to the accompanying drawings, which form a part of this specification.

My invention relates to the construction of electrodes for primary and secondary batteries, and particularly to providing such electrodes with metallic connections and, where they are needed, strengthening-ribs formed integral with the connections.

My invention consists in molding plates of active material to form the electrodes, so as to provide cavities in said active material, and then forming connection or connections and supports in said plates by pouring into said cavities a melted metal or alloy. I thus form an electrode having its metallic support and connection entirely included in and covered by active material, except, of course, that the connection above the plate is not or need not be covered by active material. Preferably I form my electrodes by molding the active material upon a fusible, soluble, or volatile core, which is, after the plates assume the requisite permanence of form, melted out or eliminated in other ways, and I then cast the metal or alloy forming the connection and support into the cavity left by said core.

I am aware that prior to my invention the plan of connecting the plates or grids which support the active material of an electrode with each other by forming on said plates perforated lugs and pouring into said lugs a metal or alloy to secure them together and form a connection had been devised by another. My invention, however, is to be distinguished therefrom in that I form perforations in the active material and supply the support and connection which takes the place of the usual grid and connection by casting metal into said perforations in the active material.

My method of forming the connections is, as stated, applicable where the plates are molded entirely of active material, and I prefer to have the metallic connection extend out into the body of the active material, and to secure this result I mold my plates of active material upon a core of the form of the cavities to be formed—as, for instance, of the perforation in the lug—and the desired extensions therefrom into the active material of the plate, forming this core of some material which can be removed without injuring the plate by fusion, or by being dissolved, or by being volatilized. I prefer to make the core of a fusible alloy. I then fuse or dissolve out the core and proceed as before to fill the cavity in the plates with melted metal or alloy, which on cooling will form the desired connection, and will also form a strengthening rib or ribs in the plate, thus virtually providing the plate with a supporting-grid and connections formed of the same casting.

Reference being now had to the drawings, Figure 1 represents in section a pair of my plates arranged together in a mold to receive the melted metal which forms the connections. Fig. 2 is a perspective view of the core upon which said plates are molded, and which is afterward melted or dissolved out preparatory to casting in the metallic connections. Fig. 3 is a face view of a plate molded on such a core; Fig. 4, a face view of a plate molded on a core having a flange, instead of a number of arms, extending out from the perforation in its lug. Fig. 5 is a section on line $xx$ of Fig. 4.

A is the plate of active material; A', a lug which I form with it, and in which I form or mold a perforation preferably of irregular longitudinal section. The reason I prefer the irregular shape of perforation is that the connection when cast in will be held securely in place and not tend to slide in the lug.

B is a core of fusible alloy, having the form of the perforations $a$, and having also projecting arms $b\ b$, &c., which form in the plates A the holes $a'\ a'$, &c., when the core is melted out.

Instead of arms $b$, a flange may be formed on the core B, such as would form a cavity like that shown at $a^2$, Figs. 4 and 5.

C C represent the mold box or arms, having pouring-holes $c\ c$ between, and in communication with which the plates A are secured, with their lugs A' in contact and their perforations $a$ registering with each other and with holes $c$.

Having been molded, freed from their cores, and adjusted in the mold-box, the plates are completed and connected by pouring a melted metal, or preferably an inoxidizable alloy—such as type metal—through the perforations and cavities and allowing it to harden there with such extension for terminals beyond the outer lug as may be desired and provided for in the mold.

By my new method I am enabled to provide connections situated entirely within the plates and of the best and most efficient character, and where support for the active material is required it is provided by extensions of the connections extending out in the active material, this feature being of great importance where plates of lead peroxide are employed.

In the claims I refer to the cores as of fusible material; but it will be understood that I embrace as well cores made of material which can be dissolved or volatilized, such being obvious equivalents of fusible cores. While in all cases I prefer to use lugs A' to inclose the metallic connections, it will be obvious that the cavities may be formed in the body of the plate and the connections cast into them without requiring the formation of a projecting lug, and the method for forming at the same time a connection and support for the plates by the use of a fusible core has no essential relationship to the use or non-use of the perforated lugs A'.

Having now described my invention, what I claim as new, and desire to secure by Letters Patent, is—

1. As a new article of manufacture, an electrode for primary or secondary batteries, consisting of a plate or plates of active material having cavities formed in their mass and provided with an integral support and connection of fusible metal filling said cavities and included and protected by the active material.

2. The described method of making electrodes for primary or secondary batteries, which consists in molding plates of active material with lugs perforated to receive the metallic connections, and then casting the connection in said perforations.

3. The described method of making electrodes for primary or secondary batteries, which consists in molding plates of active material upon cores of fusible material, then melting out the fusible material and casting the metallic connection in the cavities left in the active material.

4. The described method of making electrodes for primary or secondary batteries, which consists in molding plates of active material with lugs and upon cores of fusible material which will form perforations through the lugs, then melting out the cores and casting the connections in cavities left in the active material.

5. The described method of making electrodes for primary or secondary batteries, which consists in molding plates of active material with lugs and upon cores of fusible material which will form perforations through the lugs, with extensions from said perforations into the body of the plates, then melting out the core and casting the connections in cavities left in the active material.

DAVID PEPPER, Jr.

Witnesses:
LEWIS R. DICK,
JOSHUA MATLACK, Jr.